No. 616,601. Patented Dec. 27, 1898.
W. W. BURSON.
KNITTING MACHINE.
(Application filed Jan. 30, 1892.)
(No Model.) 4 Sheets—Sheet 1.
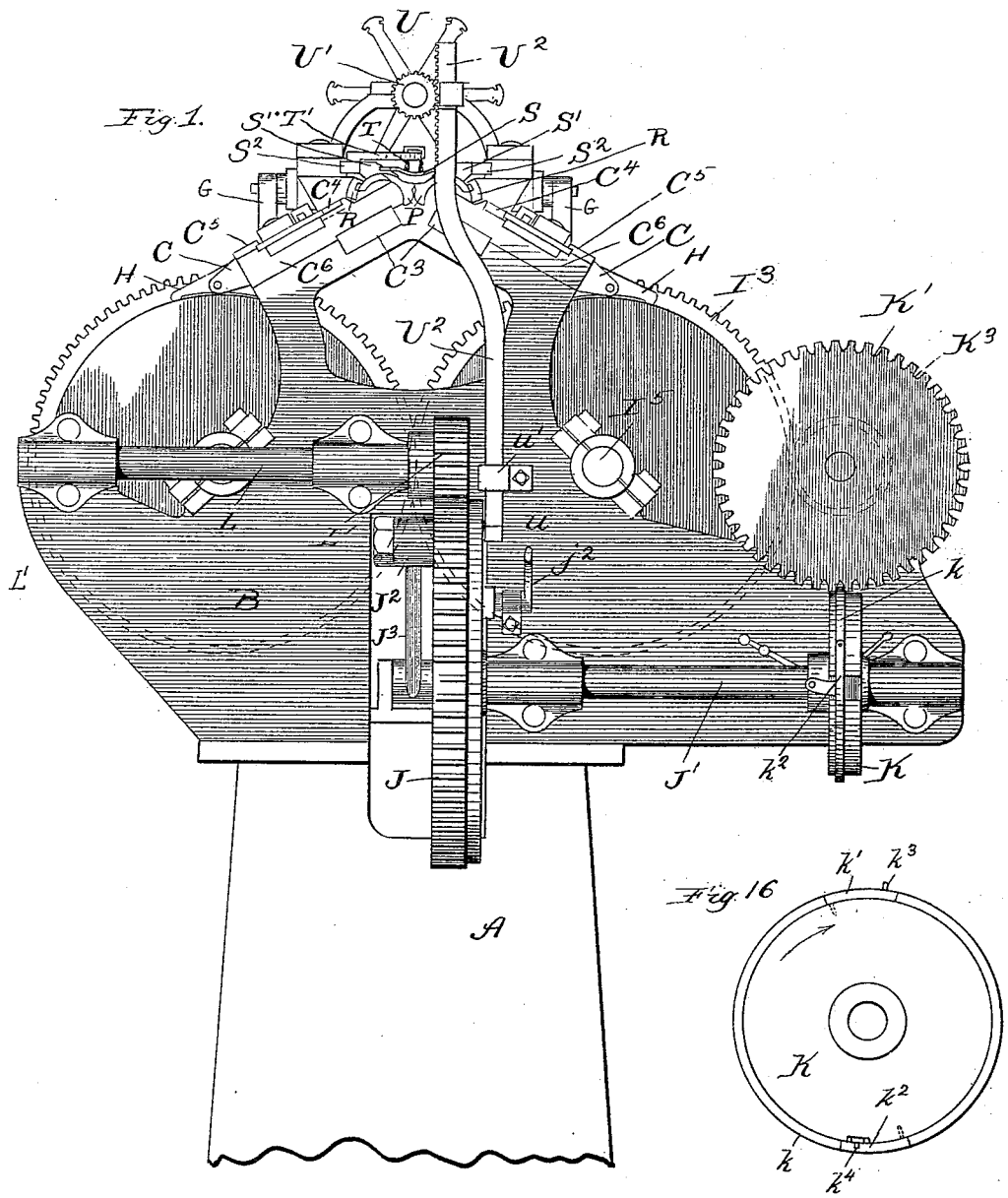
Witnesses:
Geo. E. Curtis.
Edward S. Evarts
Inventor:
William Worth Burson No. 616,601. Patented Dec. 27, 1898.
W. W. BURSON.
KNITTING MACHINE.
(Application filed Jan. 30, 1892.)
(No Model.) 4 Sheets—Sheet 2.
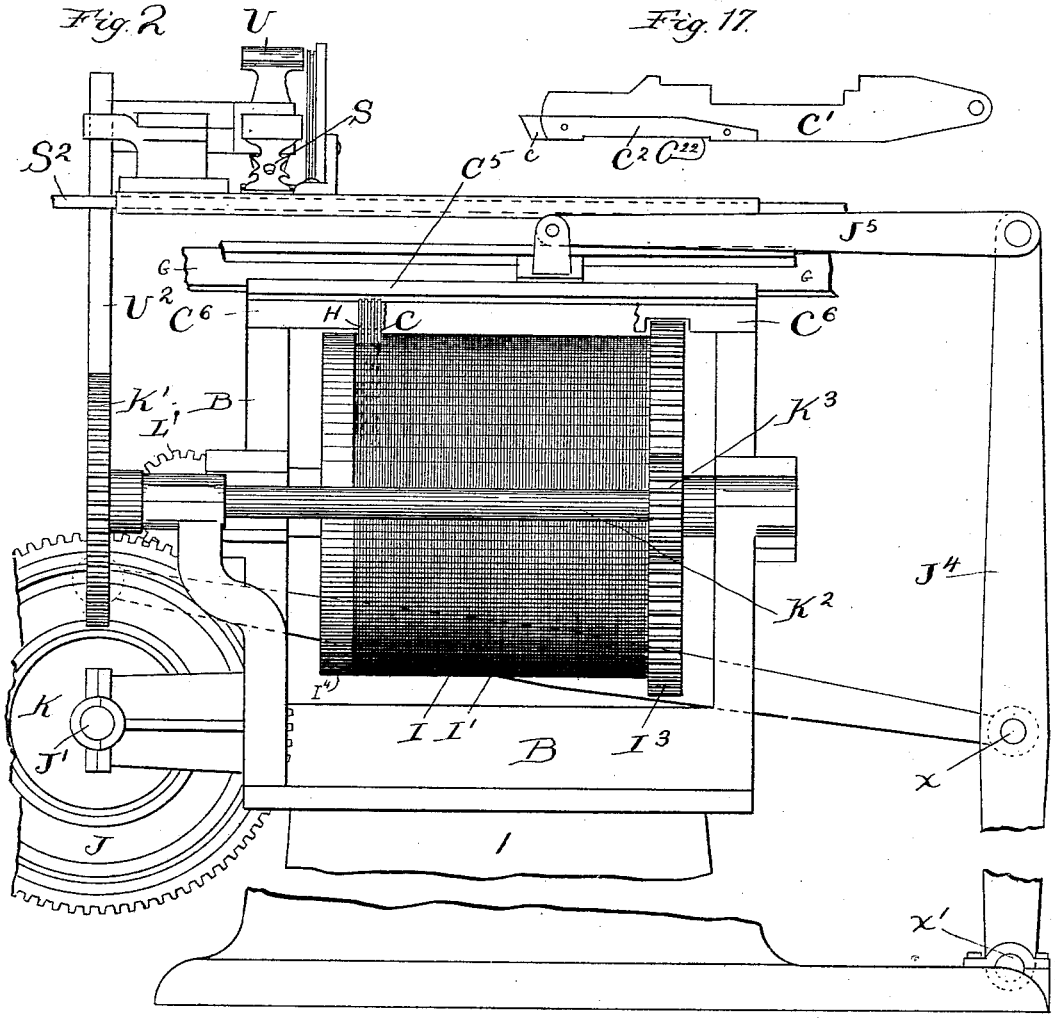
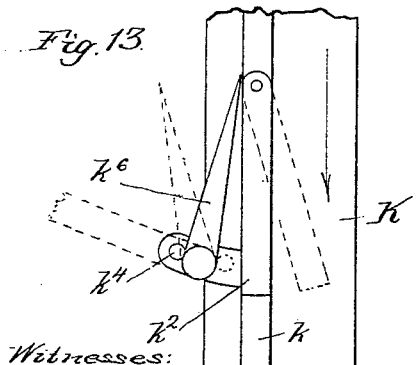
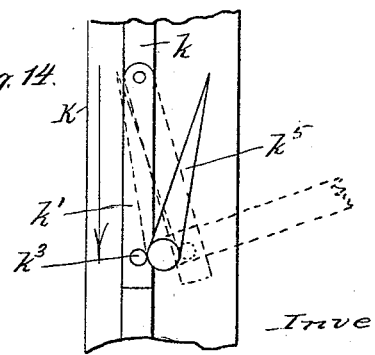
Witnesses: Inventor:
William Worth Burson

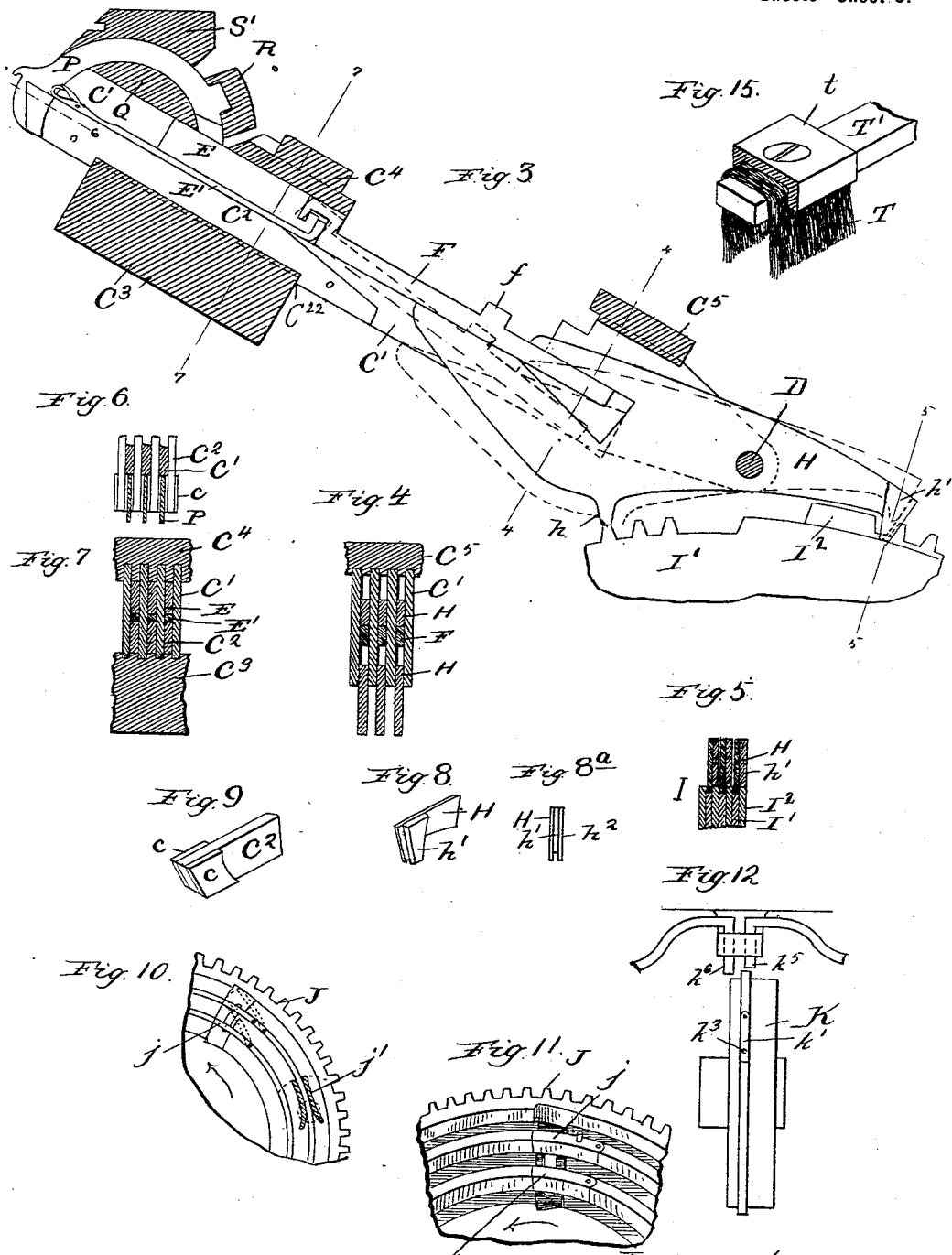

No. 616,601. Patented Dec. 27, 1898.
W. W. BURSON.
KNITTING MACHINE.
(Application filed Jan. 30, 1892.)
(No Model.) 4 Sheets—Sheet 4.
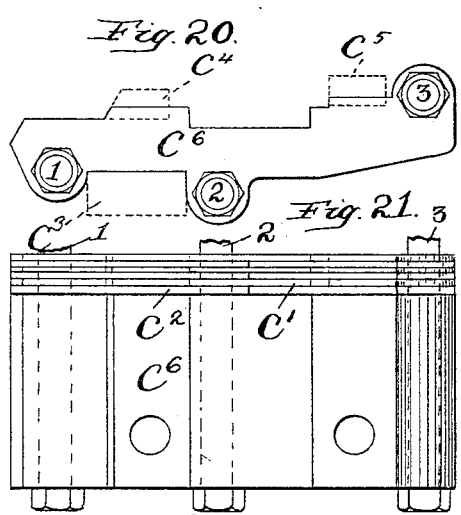
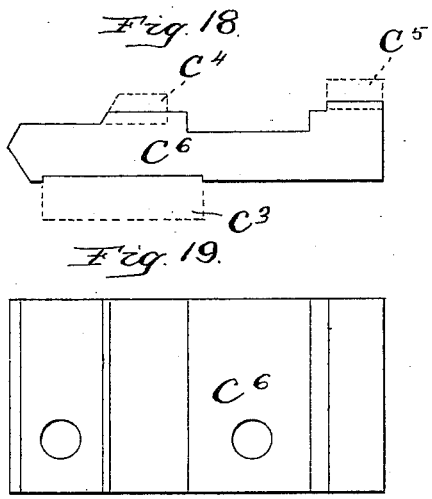
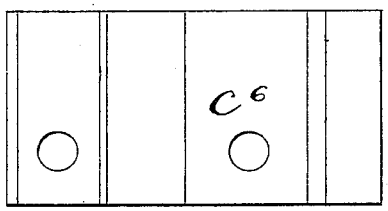
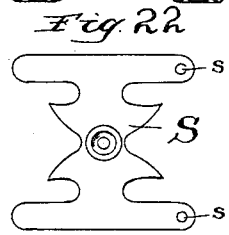
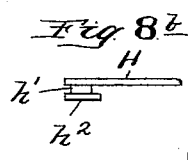
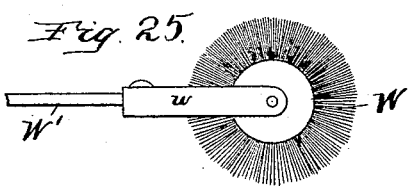
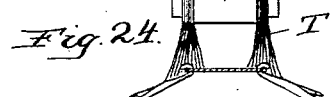
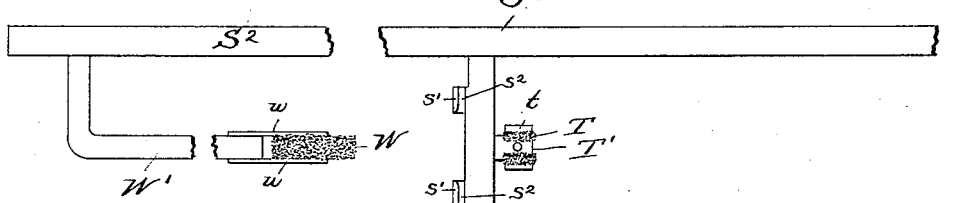
Witnesses: Inventor:
William North Burson.

United States Patent Office.

WILLIAM WORTH BURSON, OF CHICAGO, ILLINOIS.

KNITTING-MACHINE.

SPECIFICATION forming part of Letters Patent No. 616,601, dated December 27, 1898.

Application filed January 30, 1892. Serial No. 419,831. (No model.)

*To all whom it may concern:*

Be it known that I, WILLIAM WORTH BURSON, a citizen of the United States, residing at Chicago, in the county of Cook and State of Illinois, have invented a certain new and useful Knitting-Machine, of which the following is a specification.

My invention relates to knitting-machines especially adapted for the production of fashioned or irregular goods; and the objects are, first, to provide an improved needle-bed; second, to provide a pattern-cylinder composed of separate disks or plates, one of which shall be of less diameter than the other; third, to so construct these plates that they shall form a guiding-groove in which the part which controls the operation of the needle shall be held; fourth, to provide improved means of turning the pattern-cylinder; fifth, to provide an improved yarn-changer and means for operating the same, and, sixth, to provide sundry improvements in the construction and operation of the knitting-machine. I attain these objects by the mechanism illustrated in the accompanying drawings, in which—

Figure 1 is an end view of the machine. Fig. 2 is a side view. Fig. 3 is a section of the needle-bed and certain parts connected therewith. Figs. 4, 5, 6, and 7 show sections of the same on the lines, respectively, of 4 4, 5 5, 6 6, and 7 7 of Fig. 3. Fig. 8 shows the rear end of a swinging lever H. Fig. 8$^a$ shows the rear end of lever H with the plate $h^2$ applied. Fig. 8$^b$ shows a plan of the same. Fig. 9 shows front end of needle-bed piece $C^2$. Figs. 10 and 11 show part of the driving-wheel J. Figs. 12, 13, and 14 illustrate the driving switch mechanism. Fig. 15 shows latch-opening brush. Fig. 16 is a face view of wheel K. Fig. 17 shows pieces $C'$ and $C^2$. Fig. 18 shows an end view, and Fig. 19 a plan view, of needle-bed piece $C^6$ in its relation to the needle-grooves and the pieces $C'$. Fig. 20 shows the end view of a modified form of needle-bed in which the pieces $C'$ and $C^2$ are securely held in place without the aid of the spacing-pieces $C^3$, $C^4$, and $C^5$. Fig. 21 shows a plan of the modified form of piece $C^6$ in its relation to the pieces $C'$. Fig. 22 shows the yarn-carrier S. Fig. 23 shows the manner of connecting the yarn-carrier S with the operating-bars $S^2$, under side. Fig. 24 shows the relation of the brush T with the needles $E'$ $E'$ and the stitches thereon. Fig. 25 shows a revolving form of brush.

Similar letters and figures of reference refer to like parts throughout the several views.

In the present organization of my invention the general plan of construction is followed as shown in my application for patent filed March 13, 1886, Serial No. 195,111, and those parts which are common to parallel-row knitting-machines will not be specifically described here.

The knitting mechanism is supported on the column A. The frame B supports the needle-beds C and in suitable bearings the various driving-shafts and other operating devices.

The needle-bed C, which letter is applied to the finished bed when fastened together as one piece, is composed of the side pieces $C'$ and the bottom pieces $C^2$. These pieces alternating and being fastened together form the needle-grooves, Figs. 3 and 7. The piece $C^2$ is of about the right gage or thickness to form the bottom of the needle-groove whatever gage is used, and the side piece $C'$ is about the right gage to fill the space between the needles.

In the organization of the machine here shown it is necessary to have an exact agreement between the grooves of the needle-bed and those of the pattern-cylinder, hereinafter described. To insure this, the supporting-bars $C^3$, $C^4$, and $C^5$ are grooved at uniform distances apart and depth and the proper gage to receive the pieces $C'$. The pieces $C'$ and $C^2$ are conveniently notched or recessed, as at $C^{22}$, upon the bar $C^3$, whereby they are securely held in place when the bars are fastened to the frame B. For convenience of construction the end pieces $C^6$ $C^6$ are placed one at each end of the needle-bed, the pieces $C'$ and $C^2$ are fastened between them, and the finished needle-bed can then be fastened to the frame of the machine in the same manner as needle-beds formed of a single piece are fastened. The bottom pieces $C^2$ are held in vertical position on the bar $C^3$ by riveting to the side pieces C', or independent rods may be run through the entire set of pieces, or the piece may have a dovetailed connection with said bar. It will be seen that the pieces C' are fitted in a groove in bar C³ and the pieces C² rest on the surface of said bar, Figs. 3 and 7. On the front end of piece C² are riveted, one on each side, the pieces c c, Figs. 3 and 9. The presser-hook P must be considerably thinner than the piece C', and since it occupies a position directly over said piece the forward end of said hook is held in a suitable groove formed by the projecting ends of pieces C², on which are fastened the pieces c c. At the rear end of the pieces C' is a hole in which is placed the rod D, upon which rod are pivoted the oscillating levers H, the front ends of which levers move in the grooves formed by the pieces C' C'.

It will be seen from the foregoing description of the needle-bed that the needle-groove, the groove for the lower end of the presser-hook, and the fore end of the oscillating lever H are all formed by the proper construction and arrangement of the pieces C' and C². It should also be observed that the pieces C' C' furnish a support for the rod D, Figs. 1 and 3.

In the construction of the needle-bed here described the grooved bars C³ C⁴ C⁵ are made a permanent part of the structure. It is readily seen, however, that the pieces C' and C² could be placed in position on one or more of these grooved bars and then fastened securely together in such position and the grooved bars be removed and used in the preparation of other needle-beds, the grooved bars being used only to hold the needle-bed pieces in proper position while they are being secured in such position by other well-known means.

Figs. 20 and 21 show one way of fastening the needle-bed pieces C' and C² together and holding them without the spacing-bars C³, C⁴, and C⁵ being made a permanent part of the needle-bed. The rods 1 and 2 pass through the end pieces C⁶ and the groove-pieces C' and C² below the needle-groove, and the rod 3 passes through the same pieces above the needle-groove and the swinging-lever groove. If the pieces C' and C² are of the proper thickness or if they are packed with paper or other material, so as to occupy the proper distance apart, and washers or small pieces be put on rod 3 between the pieces C' C', then when all the pieces are drawn tightly together by means of the nuts on said rods 1, 2, and 3 it is readily seen that we have a firm needle-bed without the spacing-bars. If the pieces C' and C² do not entirely fill the required space set apart for them, then the said pieces can be held in position by spacing-bars, as C³, C⁴, and C⁵, and the rod 3 being provided with spacing-pieces then the parts can be soldered or brazed on the outside along the line of the rods 1, 2, and 3, when the spacing-bars can be removed.

These plans can be modified to suit the wishes of the builder.

Instead of the bar C³ connecting the pieces C⁶ C⁶, which pieces are preferably made of cast-iron, the said pieces may be joined together by an integral casting and the guide-grooves for the pieces cut in said cast pieces and the pieces C³ be thereby replaced by said cast part of the needle-bed.

The oscillating lever H, pivoted on the rod D, has a slotted opening in which the lower end of the jack F moves, which slotted opening forms, in connection with the groove in the needle-bed, a continuous groove, in which the jack moves. The oscillating lever is provided with two feet or operating-points. The forward one, h, rests on plate I' and the rear one, h', on plate I².

The pattern-cylinder I is composed of the pattern-plates I' and I², fastened together alternately between the driving gear-head I³ and the head I⁴ upon a central shaft I⁵. The plates I' are of less radial diameter than the plates I², and hence the foot h of the oscillating lever H, which rests on the plate I', is always guided in the groove formed by the larger plates I², Figs. 3 and 5. The foot h' on the rear end of the oscillating lever H rests on the plate I². I prefer to make this operating-foot by fastening the block h' on lever, which should extend somewhat below and beyond the said block, whereby the operating-foot shall be held upon its pattern-plate without any other guide, Fig. 8. This construction of the pattern-cylinder and oscillating lever insures the operating-feet of said lever being held on the pattern-plates and gives great freedom of action to the same.

It is readily seen that the foot h' may be formed by bending the end of the lever properly, so as to form said operating-foot. For the purpose of insuring the holding of the foot h' upon the pattern-plate the plate h² may be fastened on the side of the piece h', opposite lever H, and, like the end of said lever, extends below and beyond said piece h', whereby it is guided on the pattern-plate, Figs. 8ᵃ and 8ᵇ.

In the organization of the machine here shown the foot h moves constantly in a groove and no further guide is needed to hold it on the pattern-plate; but in a different construction of the pattern-cylinder, as when the pattern-plates are of equal diameter, then pieces similar to pieces h² may be fastened upon both sides of the foot h, and a space being left between the pattern-plates the said foot will be securely guided upon its pattern without other means.

That part of the needle-groove in which the needle moves is covered by the bar C⁴ and the segment Q. The needle E' has the filler-piece E placed upon it, which holds the needle closely in the groove, while permitting it to have an endwise movement.

The jack F has a hook on its forward end which engages the shank of the needle E' and filler-piece E, and an operating-lug $f$, which the knitting-cam, which is placed upon cam-bar G, engages, Fig. 3. This cam may be of any construction well known to knitters which will give the needle acting through the jack the necessary movement and is not here described.

When the foot $h$ of oscillating lever H rests upon the outer periphery of plate I', the rear foot $h'$ of said lever rests in the recess cut in plate $I^2$ and the operating-lug $f$ of the needle-jack is in position to be operated by the knitting-cam. The recess cut in plate $I^2$ is such as to leave the plate of greater radial diameter than that of plate I', so that when the recess of plate $I^2$ and outer periphery of plate I' are brought into proximity there will be a groove sufficient to hold the foot $h$ of the oscillating lever H upon its pattern-plate, Figs. 3 and 5.

When the pattern-cylinder I is turned so that the foot $h$ of the oscillating lever rests in the recess cut in plate I', then the foot $h'$ rests upon the outer periphery of plate $I^2$ and the lug $f$ of the needle-jack is held downward out of the reach of the knitting-cam and the needle remains at rest, Fig. 3.

From the foregoing description of the pattern-cylinder it is readily seen that when it is desired to have a needle operative the foot $h$ of the oscillating lever H is made to rest on the outer periphery of pattern-plate I' and the foot $h'$ must have a corresponding recess cut in plate $I^2$. On the contrary, when it is desired to have a needle inoperative that part of the plate I' under foot $h$ is cut away and that part under foot $h'$ is left with its full radial height, in which case the oscillating lever H brings the jack F below the reach of the needle-cam. In this way any desired pattern can be made for the needles.

A brush T, made of some elastic material, as bristles or fine spring-wire, is fastened on the yarn-carrier bars, so as to move in advance of the yarn-carrier. The brush rubs upon the needles at the time when they are being advanced by the knitting-cam and operates to hold the stitches upon the needles (see Fig. 24) and is especially useful in irregular work, as the toe and heel of hosiery. It engages the needles as they begin to advance and holds down the stitches upon the same. Thus it becomes of great service at the time of "setting up" and performs the work which the usual presser-hooks are unable perfectly to perform, for at this time the said presser-hooks fail to engage with the yarn. The brush also operates to open or throw back the latch of the advancing needle, and thereby in part or entirely dispenses with the use of a regular latch-opener. The brush here shown, Fig. 15, is formed by fastening the bristles T upon the support T' by the flanged piece $t$.

I have also used a revolving brush W, Fig. 25, pivoted upon its center, which in some conditions is preferred to the form here illustrated.

When a single brush, as T, is used, it will only operate, as hereinbefore described, when the machine is moving in one direction or when moving from the "home end" of the knitting. Where it is desired to have a brush operate upon the needles when knitting in either direction, a brush must be placed a proper distance in advance of the yarn-carrier at both its ends. When thus constructed, the brush in advance of the carrier will operate, as above described, without regard to the direction the carrier is moving and the brush which follows the carrier will only draw the trash from the needles. A convenient form of supporting-brush W is shown in Fig. 23, where the arm W', which supports brush W, is bent and fastens to the yarn-carrier bar $S^2$, near its end, whereby the bar W' can pass through wheel U and be withdrawn when said wheel is to be turned. The brush is centrally located between the needle-beds, so as to act with equal force upon both rows of needles.

The shaft $I^5$ of the pattern-cylinder rests in suitable bearings in the frame B. Upon this shaft, and preferably forming one head of the pattern-cylinder, is fastened the gear $I^3$. The pattern-cylinders receive their movement as follows: The driving-shaft L, held in suitable bearings upon the frame B, has upon its outer end (not here shown) a crank or driving-pulley and upon its inner end the driving-pinion L', which meshes into gear J. The shaft J', held in suitable bearings upon the frame B, has the gear-wheel J on one end and the worm-wheel K near the other end. The shaft $K^2$, supported in bearings upon the frame B, has fastened upon one end the worm-gear K', which engages with the worm-wheel K, and on the other end the pinion $K^3$, which meshes in the gear $I^3$ of the pattern-cylinder.

In the organization of the machine here shown there are two needle-beds and two pattern-cylinders, substantially duplicates, and each cylinder is provided with a gear $I^3$, exact duplicates, which mesh together, and when one cylinder is turned its fellow will in like manner make the same movement, Figs. 1 and 2.

The wheel which I have called the "worm-wheel" K is not a true worm-wheel, but has a straight tongue or flange $k$ extending radially outward from its periphery. A portion of this flange is cut away and replaced by a swinging switch $k'$, pivoted in the line of the flange. When the forward end of this swinging switch is in line with the fixed flange, it passes through the teeth of worm-gear K' without moving said gear; but when the swinging end passes through the space of the adjoining tooth it moves the worm-gear one tooth, which in turn moves gear $I^3$ one step by the action of pinion $K^3$. In the side of the worm-wheel K opposite the switch $k'$ is a similar switch $k^2$, which has the same movement and operates in the same manner as the switch $k'$. The switch $k'$, Fig. 14, is controlled by the guiding-switch $k^5$, pivoted outside the periphery of the worm-wheel K, which is made to engage the stud $k^3$ on the front end of the switch $k'$. The swinging end of switch $k^5$ has a sweep sufficient to gather in the stud $k^3$ in its extreme movements in either direction. In Fig. 14 the full lines show the switch $k'$ as inoperative and the dotted lines as operative. The swinging switches $k'$ and $k^2$ must each have an independent movement and so require each a different controlling mechanism. The worm-wheel just described is called "irregular," because the movement given the worm-gear, when any is given, is made in a small part of the periphery of the worm-wheel and the rest of the time the gear remains at rest, while in the true worm wheel and gear the movement of the gear is uniform with the movement of the worm-wheel.

In Fig. 13 the switch $k^2$ is shown with an arm fastened to its lower edge. On the outer end of this arm is a stud $k^4$, which is controlled in the same manner by a guiding-switch $k^6$, as has already been described for its fellow. The full lines show the switch $k^2$ inoperative and the dotted lines as operative. These switches are shown controlled by handles. The switches $k'$ and $k^2$ are placed on opposite sides of the worm-wheel K, whereby a movement of the pattern-cylinders may be had at each end of the movement by the cam-bars. Sometimes it is necessary to move the pattern at the home end, where the yarn-changing wheel is placed, sometimes at the opposite end of the stroke, and sometimes no movement is needed, and these requirements are all met by simply moving and controlling the swinging switches $k'$ and $k^2$.

The yarn-carrier S is moved by its upturned studs $s\ s$, Fig. 22, engaging the grooves $s^2\ s^2$ in the lugs $s'$ of the cross-bar which connects the bars $S^2$. While the yarn-carrier is moved in the groove shown in the bar S', Figs. 1 and 3, it is held rigidly to work; but when the carrier enters the wheel U it is readily released from this connection and another substituted in its place, as hereinafter to be described.

The yarn-changing device consists, substantially, of the open wheel or spider U, the arms of which are grooved and form a part of the track in which the yarn-carrier S is moved. The wheel U is placed at what is called the "home end" of the yarn-carrier movement, and when the yarn-carrier S is in the wheel U if then the wheel is turned the carrier which was being used will be moved out of engagement and another brought into engagement with its moving bar. This movement is made while the carrier is at the dead-point of the stroke, and therefore at rest so far as its operative movement is concerned. The manner of turning or oscillating the wheel U is as follows: Upon the same shaft with wheel U is the pinion U', the shaft being supported in bearings, as shown in Figs. 1 and 2. The rack-bar $U^2$ is held in the guides $u'$ and has on the upper end a rack which meshes in pinion U' and on its lower end a stud $u$, which moves in a groove in the face of wheel J. There are as many grooves in the face of the wheel as it is desired to have movements of the wheel U, and these grooves are of such distance apart that the passage of the stud $u$ from one groove to the other will turn the pinion U' just far enough to change the alinement of the wheel U from one space to another. In Figs. 10 and 11 are shown the switches $j$, pivoted in the walls of the grooves in the face of wheel J and adapted to swing one space either inward or outward. These switches are conveniently tied together, so that the movement of one will control the other. When the free end of switch $j$ is thrown outward, it will engage the stud $u$ by the revolution of wheel J and draw the rack-bar down, and hence turn the wheel U in one direction, and when the switch is turned inward the stud $u$ is forced upward and the wheel U is turned in the other direction. These switches are conveniently controlled by a pin in the switch which enters the guide $j'$, which guide is controlled by a suitable handle $j^2$, Figs. 1, 10, and 11.

In operation the shaft L is turned either manually or by power, and its pinion L', meshing in the teeth of wheel J, turns it. Upon the outer face of this wheel is the wrist-pin $J^2$, which is engaged by pitman $J^3$, connecting the said wheel with the perpendicular oscillating lever $J^4$ at $x$. This lever is preferably made of two parts joined together, and its lower end is pivoted on two bearings on the base of the column A at $x'$. At the upper end of lever $J^4$ are pivoted two pitmen $J^5$ $J^5$, which connect with the cam-bars G G, Figs. 1 and 2. The yarn-carrier bars $S^2$ $S^2$ and the presser-hook cam-bars R R are given a suitable movement by connection with the cam-bars. The yarn-carrier moves in the groove shown in bar S' and in the grooves shown in the arms of the wheel U, Figs. 1 and 3. The presser-hooks P move in circular grooves formed in the segment Q. It will be readily seen that the rotation of wheel J oscillates lever $J^4$, and hence moves the cam-bars G G, with their needle-cams, across the needle-beds, as is well understood in the art. The oscillating switches $k'$ $k^2$ move the pattern-cylinders when out of line of the fixed flange $k$, as already described. When it is desired to change the yarn being knit, the switches $j$ are moved by hand from their central or neutral position either outward or inward, as may be desired, when the wheel U will be moved one step and another carrier, with its yarn, brought into action.

I do not wish to confine myself to the exact construction here shown, as various changes can be made without departing from the scope of my invention.

What I claim is—

1. The combination of a series of alternating pieces, adapted to form the bottom and sides of the needle-groove and to form a groove and furnish a support for the pivot of the oscillating lever H and lever H, operating substantially as and for the purpose specified.

2. The combination of the pieces $C'$ and $C^2$, the pivot-rod D and oscillating lever H, operating substantially as and for the purpose set forth.

3. The combination of the pieces $C'$ and $C^2$ and the grooved supporting-bars $C^3$, $C^4$ and the pieces $C^5$, adapted to form a needle-bed, substantially as set forth.

4. The combination of a series of alternating pieces $C'$, $C^2$, to form a needle-bed, the needle $E'$, the filler-piece E, the jack F and a cover for the needle-groove over the filler-piece, operating substantially as and for the purpose set forth.

5. The combination of the needle-bed pieces $C'$, the pieces $C^2$ provided with blocks $c\,c$ and the presser-hook P, with means to operate said hook, operating substantially as and for the purpose set forth.

6. The combination of a needle-bed composed of the pieces $C'$, $C^2$, the oscillating levers H, pivoted thereon, the pattern-cylinder composed of the plates $I'$ and $I^2$ of unequal diameter, whereby the feet of the oscillating levers shall be held upon the said pattern-plates and the needles controlled thereby, substantially as specified.

7. The pattern-cylinder composed of a series of larger and of smaller pattern-plates, alternating, the shaped edge of the smaller plate forming the bottom of an annular groove, substantially as and for the purposes set forth.

8. The combination of a pattern-cylinder composed of a series of larger and of smaller pattern-plates, alternating, the smaller plate forming the bottom of an annular groove, and an oscillating lever adapted to govern the operation of the needle, substantially as set forth.

9. The combination of a pattern-cylinder composed of a series of pattern-plates, and oscillating levers, each of said levers having an operating-foot which is provided with a guide-piece that extends beyond the said foot and into the space at the side of the plate on which said foot rests, substantially as described.

10. The combination of a pattern-cylinder composed of a series of pattern-plates, the lever H having the foot $h'$ and guide-plate $h^2$ operating substantially as set forth.

11. In a knitting-machine, parallel rows of needles, and two pattern-cylinders adapted to control the same, the jacks and oscillating levers herein shown, the pattern-cylinders being formed of pattern-plates held on a central shaft between two heads, one of which heads on each cylinder has gear-teeth upon it, adapted to mesh together and to be driven by an outside pinion meshing in one of said gears, substantially as set forth.

12. In a knitting-machine the combination of the pattern-plates $I'$ and $I^2$, the shaft $I^5$, the cylinder gear-head $I^3$, and the cylinder-head $I^4$, to form a pattern-cylinder substantially as and for the purpose set forth.

13. The combination of a worm-wheel provided with two oscillating switches, a worm-gear, a pattern-cylinder operated from said worm-gear, reciprocating cam-bars, the needles and devices controlled by the pattern-cylinder and determining the actuation of the needles, whereby the pattern-cylinder is moved at either end of the cam-bar movements, or allowed to remain at rest, substantially as specified.

14. In a knitting-machine, the wheel K provided with the fixed flange $k$, the switches $k'$ and $k^2$ hinged opposite in said flange and meshing in the worm-gear $K'$, a pattern-cylinder operatively connected thereto and a reciprocating knitting mechanism with means for operating the same whereby the pattern-cylinder may be moved at each end of the knitting stroke or remain at rest, operating substantially as and for the purpose set forth.

15. The combination of the wheel K provided with the flange $k$, the operating-switch $k'$, provided with a guiding pin or part $k^3$, the guiding-switch $k^5$, the worm-gear $K'$, a pattern-cylinder operatively connected to said gear $K'$, operating substantially as described.

16. The combination of the wheel K provided with a flange $k$, the operating-switches $k'$ and $k^2$ pivoted opposite each other in line of said flange, each provided with a guiding pin or part, the guiding-switch $k^5$ adapted to control switch $k'$, the guiding-switch $k^6$ adapted to control switch $k^2$, and a pattern-cylinder operatively connected to the wheel K, substantially as set forth.

17. The combination of the wheel U located at one end of the yarn-carrier movement, the pinion $U'$ fastened on the same shaft with wheel U, the rack on the end of bar $U^2$ meshing in said pinion, the stud $u$ on the lower end of bar $U^2$ moving in concentric grooves formed in the face of wheel J and the switches $j$ adapted to turn the stud $u$ from one groove to another, whereby the rack shall turn the pinion and yarn-changing wheel, substantially as specified.

18. The combination of the wheel U with its pinion $U'$ the rack and stud on bar $U^2$, the wheel J with concentric grooves in its face provided with the switches $j$ and the switch-guide $j'$, operating substantially as and for the purpose set forth.

19. The combination with the two rows of needles, and the yarn-carrier, of a flexible brush in advance of the yarn-carrier and engaging the needles as they begin to advance, whereby the stitches shall be held upon the needles and the latches opened, substantially as described.

20. The combination of a flexible brush, the yarn-carrier bars, an arm W' supporting said brush, and a yarn-changing device having an elevated support, whereby the said brush shall pass over the needles and be removed from the path of the yarn-changing device at the proper time, substantially as set forth.

WILLIAM WORTH BURSON.

Witnesses:
H. M. MUNDAY,
EMMA HACK.